(12) United States Patent
Sanno

(10) Patent No.: US 12,395,725 B2
(45) Date of Patent: Aug. 19, 2025

(54) IMAGE PROCESSING APPARATUS, IMAGE PROCESSING METHOD, AND IMAGE CAPTURE APPARATUS

(71) Applicant: CANON KABUSHIKI KAISHA, Tokyo (JP)

(72) Inventor: Masato Sanno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 247 days.

(21) Appl. No.: 18/307,067

(22) Filed: Apr. 26, 2023

(65) Prior Publication Data

US 2023/0370714 A1    Nov. 16, 2023

(30) Foreign Application Priority Data

May 10, 2022    (JP) ................ 2022-077691

(51) Int. Cl.
| | |
|---|---|
| *H04N 23/63* | (2023.01) |
| *G06T 7/246* | (2017.01) |
| *G06T 7/73* | (2017.01) |
| *H04N 23/611* | (2023.01) |

(52) U.S. Cl.
CPC .......... *H04N 23/635* (2023.01); *G06T 7/246* (2017.01); *G06T 7/73* (2017.01); *H04N 23/611* (2023.01); *H04N 23/632* (2023.01); *G06T 2207/20104* (2013.01); *G06T 2207/30196* (2013.01)

(58) Field of Classification Search
None
See application file for complete search history.

(56) References Cited

U.S. PATENT DOCUMENTS

2022/0094840 A1    3/2022    Hongu et al.

FOREIGN PATENT DOCUMENTS

JP    2022-051280 A    3/2022

*Primary Examiner* — Christopher Braniff
(74) *Attorney, Agent, or Firm* — Venable LLP

(57) ABSTRACT

An image processing apparatus detects, for a plurality of images obtained chronologically, a position of a characteristic area to be tracked, and generates, based on data of the plurality of images, display image data on which an indicator indicating the characteristic area to be tracked is superimposed. The image processing apparatus generates, when a predetermined condition regarding the characteristic area to be tracked or an apparatus that shot the plurality of images is satisfied, the display image data on which an indicator indicating a characteristic area aside from the characteristic area to be tracked is further superimposed. The image processing apparatus generates, when the predetermined condition is not satisfied, the display image data on which an indicator indicating the characteristic area aside from the characteristic area to be tracked is not superimposed.

14 Claims, 8 Drawing Sheets

FIG. 2

IMAGE PROCESSING APPARATUS, IMAGE PROCESSING METHOD, AND IMAGE CAPTURE APPARATUS

BACKGROUND OF THE INVENTION

Field of the Invention

The present invention relates to an image processing apparatus, an image processing method, and an image capture apparatus, and particularly relates to improvements in a function that utilizes characteristic area detection.

Description of the Related Art

Past image processing apparatuses, such as image capture apparatuses, have detected characteristic areas such as faces and heads from images, and used the characteristic areas to set focus detection areas, for example Japanese Patent Laid-Open No. 2022-51280. Japanese Patent Laid-Open No. 2022-51280 discloses an image capture apparatus that automatically selects a main subject from among detected candidates and executes autofocus to focus on the selected main subject. This document also discloses displaying frame-shaped indicators superimposed on a main subject area and a candidate area.

When displaying an indicator for all detected characteristic areas as described in Japanese Patent Laid-Open No. 2022-51280, if a large number of characteristic areas are detected, displaying the indicators can interfere with shooting, such as by making it difficult to see the subject. Additionally, with Japanese Patent Laid-Open No. 2022-51280, a user cannot know in advance which candidate area is likely to be a new main subject area when the current main subject area may be switched to an automatically selected main subject area.

SUMMARY OF THE INVENTION

The present invention provides, in one aspect, an image processing apparatus, an image processing method, and an image capture apparatus that realize the display of an indicator for a characteristic area, and which therefore can alleviate at least one of the issues with the past techniques.

According to an aspect of the present invention, there is provided an image processing apparatus comprising: one or more processors that execute a program stored in a memory and thereby function as: a tracking unit configured to detect, for a plurality of images obtained chronologically, a position of a characteristic area to be tracked; and a generating unit configured to generate, based on data of the plurality of images, display image data on which an indicator indicating the characteristic area to be tracked is superimposed, wherein the generating unit: when either of: overlap between the characteristic area to be tracked and another characteristic area; a change in the position or a size of the characteristic area to be tracked; an orientation of the characteristic area to be tracked; or movement of an apparatus that shot the plurality of images satisfies a predetermined condition, generates the display image data on which an indicator indicating a characteristic area aside from the characteristic area to be tracked is further superimposed; and when the predetermined condition is not satisfied, generates the display image data on which an indicator indicating the characteristic area aside from the characteristic area to be tracked is not superimposed.

According to an aspect of the present invention, there is provided an image capture apparatus comprising: a shooting module that shoots a plurality of images chronologically; and an image processing apparatus using the plurality of images shot by the shooting module, wherein the image processing apparatus comprises one or more processors that execute a program stored in a memory and thereby function as: a tracking unit configured to detect, for a plurality of images obtained chronologically, a position of a characteristic area to be tracked; and a generating unit configured to generate, based on data of the plurality of images, display image data on which an indicator indicating the characteristic area to be tracked is superimposed, wherein the generating unit: when either of: overlap between the characteristic area to be tracked and another characteristic area; a change in the position or a size of the characteristic area to be tracked; an orientation of the characteristic area to be tracked; or movement of an apparatus that shot the plurality of images satisfies a predetermined condition, generates the display image data on which an indicator indicating a characteristic area aside from the characteristic area to be tracked is further superimposed; and when the predetermined condition is not satisfied, generates the display image data on which an indicator indicating the characteristic area aside from the characteristic area to be tracked is not superimposed.

According to an aspect of the present invention, there is provided an image processing method executed by an apparatus, the image processing method comprising: detecting, in a plurality of images obtained chronologically, a position of a characteristic area to be tracked; and generating, based on data of the plurality of images, display image data on which an indicator indicating the characteristic area to be tracked is superimposed, wherein the generating includes: when either of: overlap between the characteristic area to be tracked and another characteristic area; a change in the position or a size of the characteristic area to be tracked; an orientation of the characteristic area to be tracked; or movement of an apparatus that shot the plurality of images satisfies a predetermined condition, generating the display image data on which an indicator indicating a characteristic area aside from the characteristic area to be tracked is further superimposed; and when the predetermined condition is not satisfied, generating the display image data on which an indicator indicating the characteristic area aside from the characteristic area to be tracked is not superimposed.

According to an aspect of the present invention, there is provided a non-transitory computer-readable medium having stored therein a program that, when executed by a computer, causes the computer to function as an image processing apparatus comprising: a tracking unit configured to detect, for a plurality of images obtained chronologically, a position of a characteristic area to be tracked; and a generating unit configured to generate, based on data of the plurality of images, display image data on which an indicator indicating the characteristic area to be tracked is superimposed, wherein the generating unit: when either of: overlap between the characteristic area to be tracked and another characteristic area; a change in the position or a size of the characteristic area to be tracked; an orientation of the characteristic area to be tracked; or movement of an apparatus that shot the plurality of images satisfies a predetermined condition, generates the display image data on which an indicator indicating a characteristic area aside from the characteristic area to be tracked is further superimposed; and when the predetermined condition is not satisfied, generates the display image data on which an indicator indicating the characteristic area aside from the characteristic area to be tracked is not superimposed.

Further features of the present invention will become apparent from the following description of exemplary embodiments (with reference to the attached drawings).

BRIEF DESCRIPTION OF THE DRAWINGS

FIG. 2 is a diagram illustrating an example of the configuration of an image sensor according to the embodiment.

DESCRIPTION OF THE EMBODIMENTS

Figure 1:
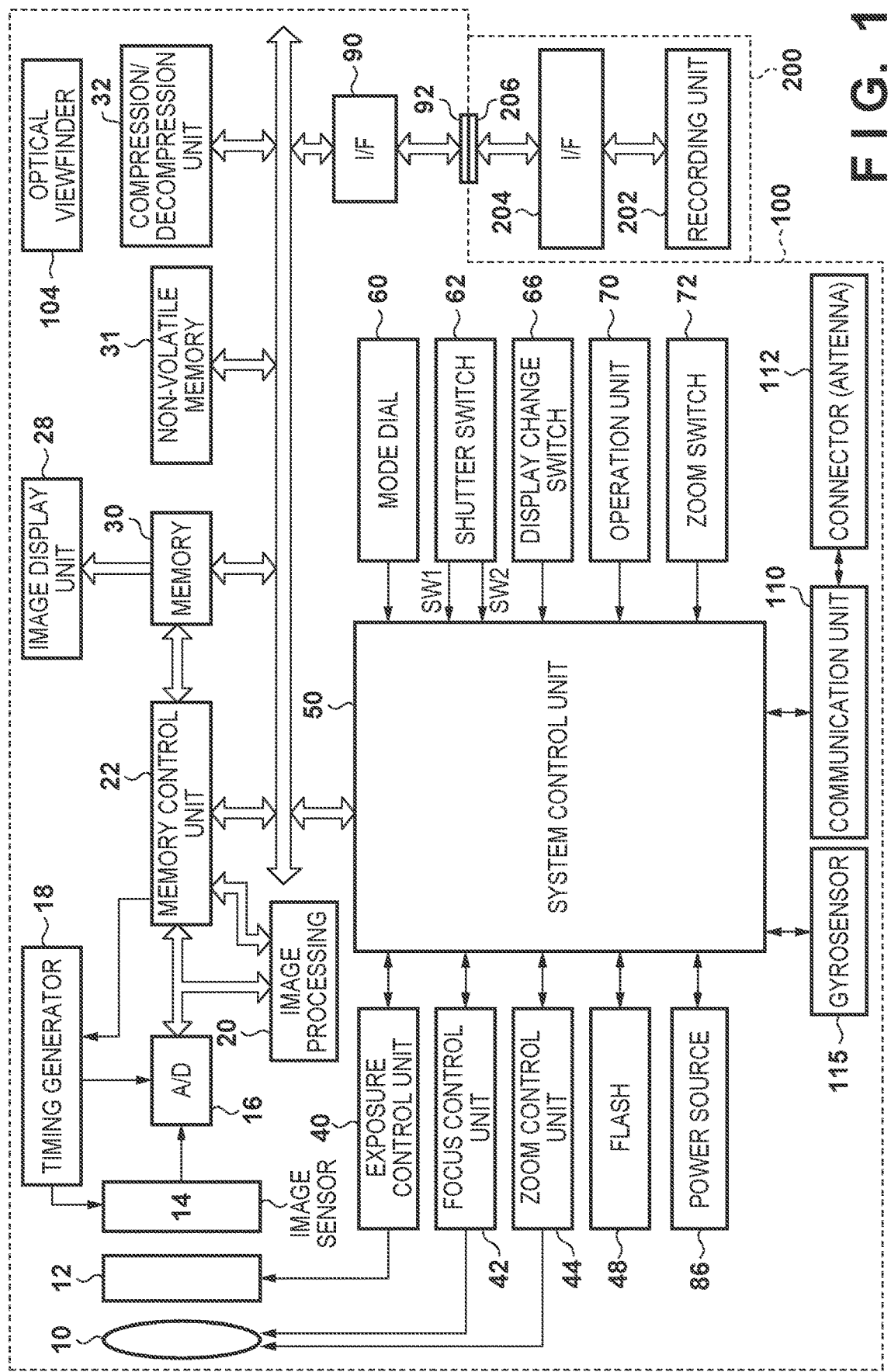
FIG. 1 is a block diagram illustrating an example of the functional configuration of a digital camera serving as an example of an image processing apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that the following embodiment will describe a case where the present invention is applied in a digital camera serving as an example of an image processing apparatus. However, an image capture function is not essential to the present invention, and the present invention can be implemented in any electronic device capable of detecting a characteristic area. Examples of such an electronic device include video cameras, computer devices (personal computers, tablet computers, media players, PDAs, and the like), mobile phones, smartphones, game consoles, robots, drones, and dashboard cameras. These are merely examples, however, and the present invention can be applied in other electronic devices as well.

Camera Configuration

FIG. 1 is a block diagram illustrating an example of the functional configuration of a digital camera 100 serving as an example of an image processing apparatus according to the present embodiment.

A lens unit 10 forms an optical image of a subject on an image capturing surface of an image sensor 14. An aperture stop 12 that functions as a shutter is provided between the lens unit 10 and the image sensor 14. The lens unit 10 has a focus lens for adjusting the focal distance and a zoom lens for adjusting the angle of view. The focus lens is driven by a focus control unit 42, and the zoom lens is driven by a zoom control unit 44, both under the control of a system control unit 50.

The image sensor 14 may be a publicly-known CCD or CMOS color image sensor having, for example, a primary color Bayer array color filter. The image sensor 14 includes a pixel array, in which a plurality of pixels are arranged two-dimensionally, and peripheral circuitry for reading out signals from the pixels. Each pixel accumulates a charge corresponding to an amount of incident light through photoelectric conversion. By reading out, from each pixel, a signal having a voltage corresponding to the charge amount accumulated during an exposure period, a group of pixel signals (analog image signals) representing an optical image formed on the image capturing surface is obtained.

Figure 2:
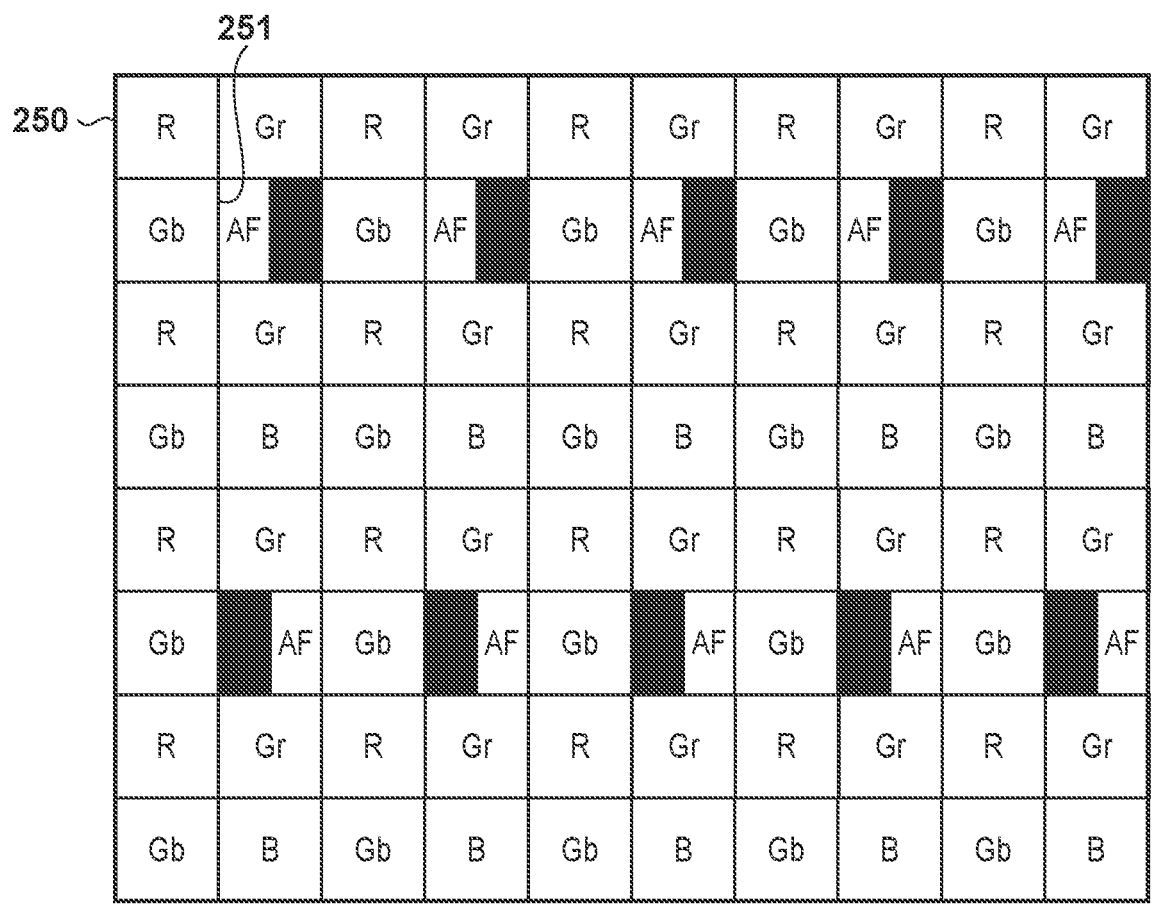

Dedicated pixels for generating focus detection signals (focus detection pixels) are disposed in the pixel array of the image sensor 14. FIG. 2 illustrates part of the pixel array in the image sensor 14. The pixel array includes image capturing pixels 250 for which a photoelectric conversion area is not blocked, and focus detection pixels 251 for which a portion of the photoelectric conversion area is blocked. "R", "Gr", "Gb", and "B" indicate the color of the color filter provided for each pixel. In the example illustrated in FIG. 2, of the 2×2 pixels serving as a unit of repetition of the primary color Bayer array color filter, the focus detection pixels 251 are disposed at the positions of the B pixels. Note that instead of blocking a portion of the photoelectric conversion area, pixels having a configuration which divides the photoelectric conversion area may be provided as the focus detection pixels. Furthermore, the configuration may be such that pixels having a configuration which divide the photoelectric conversion area are disposed over a broad range (e.g., the entire area) and are also used as image capturing pixels by providing a primary color Bayer array color filter or the like.

A signal group obtained from focus detection pixels, among the focus detection pixels disposed within the focus detection area, for which the right half of the photoelectric conversion area is blocked (an A image), and a signal group obtained from focus detection pixels for which the left half of the photoelectric conversion area is blocked (a B image), are a pair of focus detection signals. A defocus amount is obtained from the phase difference between the pair of focus detection signals.

An A/D converter 16 A/D converts an analog image signal output by the image sensor 14 into a digital image signal (image data).

A timing generator 18 supplies clock signals and control signals to the image sensor 14 and the A/D converter 16. The operations of the timing generator 18 are controlled by a memory control unit 22 and the system control unit 50.

An image processing unit 20 generates signals and image data for different purposes, obtains and/or generates various types of information, and so on by applying predetermined image processing to the image data output by the A/D converter 16 or the memory control unit 22. The image processing unit 20 may be a dedicated hardware circuit, such as an Application Specific Integrated Circuit (ASIC) designed to implement a specific function, for example. Alternatively, the image processing unit 20 may be constituted by a processor such as a Digital Signal Processor (DSP) or a Graphics Processing Unit (GPU) executing software to implement a specific function. The image processing unit 20 outputs the obtained or generated information, data, and the like to the system control unit 50, the memory control unit 22, or the like, depending on the purpose of use.

The image processing applied by the image processing unit 20 can include preprocessing, color interpolation processing, correction processing, detection processing, data processing, evaluation value calculation processing, special effect processing, and so on, for example.

The preprocessing includes signal amplification, reference level adjustment, defective pixel correction, and the like.

The color interpolation processing is performed when the image sensor is provided with a color filter, and interpolates the values of color components that are not included in the individual pixel data constituting the image data. Color interpolation processing is also called "demosaicing".

The correction processing can include white balance adjustment, tone adjustment, correction of image degradation caused by optical aberrations of the lens unit 10 (image restoration), correction of the effects of vignetting in the lens unit 10, color correction, and the like.

The detection processing can include detecting and tracking a characteristic area (e.g., the face, head, torso, a particular organ (e.g., an eye, pupil, nose, mouth, or the like) of a human and/or an animal), processing for recognizing a person, or the like.

The data processing can include cropping an area (trimming), image compositing, scaling, and header information generation (data file generation). The image data may be encoded and decoded by the image processing unit 20 instead of by a compression/decompression unit 32. The generation of display image data and recording image data is also included in the data processing.

The evaluation value calculation processing can include processing such as generating signals, evaluation values, and the like used in automatic focus detection (AF), generating evaluation values used in automatic exposure control (AE), and the like. The aforementioned pair of focus detection pixel signals are also generated through the evaluation value calculation processing.

The special effect processing includes adding bokeh effects, changing color tones, relighting processing, and the like.

Note that these are merely examples of the processing that can be applied by the image processing unit 20, and the processing applied by the image processing unit 20 is not limited thereto.

The image processing unit 20 outputs the position and size, a detection reliability, and the like of the characteristic area as the result of the detection processing. The detection of the characteristic area by the image processing unit 20 can be realized through any publicly-known method. For example, a face area can be detected by pattern matching using data representing contour shapes of faces, saved in advance in the image processing unit 20, as a template. Meanwhile, the image processing unit 20 obtains a degree of matching with the template as a reliability, and may take only areas for which the degree of matching is at least a threshold as face areas.

Additionally, a plurality of types of templates pertaining to facial contours may be prepared to increase the number of detectable face types and improve the detection accuracy, and a face area may be detected based on the results of template matching using individual templates. Additionally, the face area may be detected based on a result of template matching using a contour template and a template of a type different from the contour. For example, a portion of the shape of a face may be used as a template. In addition, templates of different sizes may be generated and used according to enlargement and/or reduction in order to detect face areas of different sizes.

Additionally, when a facial organ (an eye, pupil, nose, mouth, or the like) is detected, the image processing unit 20 applies pattern matching using a template pertaining to the shapes of organs, prepared in advance, to the detected face area. The image processing unit 20 obtains a degree of matching with the template as a reliability, and may take only areas for which the degree of matching is at least a threshold as organ areas.

The characteristic area may be detected using a method aside from template matching. For example, the characteristic area can be detected using machine learning (deep learning or the like). For example, the image processing unit 20 can generate a detector for characteristic areas by applying a trained model prepared for each type of characteristic area to a convolutional neural network (CNN) using a circuit or program that implements the CNN. The trained model (a parameter set) can be prepared in advance in a non-volatile memory 31, for example. By using different trained models for the same image data, a plurality of types of subject areas can be detected.

For example, a trained model for detecting the pupils, faces, and body parts of dogs and cats, a trained model for detecting pupils, faces, and body parts of birds, and a trained model for detecting vehicles such as trains and automobiles are prepared in the non-volatile memory 31. By selecting one of the three trained models and applying the model in the image processing unit 20, the system control unit 50 can cause the image processing unit 20 to detect the characteristic area corresponding to the selected trained model.

By applying the three trained models to the image processing unit 20 in sequence and performing the detection processing three times on the same image data, all types of subject areas corresponding to the three trained models can be detected.

An example in which pattern matching is used to detect faces and organs, such as the pupils, faces, and body parts of dogs, cats, and birds, or vehicles, using trained models, has been described here. However, the types of characteristic areas to be detected are not limited thereto. Furthermore, the combinations of the type of the characteristic area to be detected and the detection method is not limited to that described here.

Tracking processing performed by the image processing unit 20 will be described next. The tracking processing is processing for tracking a specific area for a plurality of images shot chronologically (e.g., a plurality of frames of a moving image, or still images of a plurality of frames shot through continuous shooting). The tracking processing can be realized by repeating pattern matching using a specific area as a template and updating the template according to the area detected through the pattern matching on a frame-by-frame basis.

The image processing unit 20 calculates a correlation value while changing the position of the template with respect to the frame being handled, and detects an area having the highest correlation with the template. The correlation value may be, for example, the sum of the absolute values of differences among the luminance values of the pixels corresponding to the positions. Note that differences in the values of color components, the degree of matching with a histogram, or the like may be obtained as the correlation value instead of luminance values. The method of searching for the most similar area to the template is not particularly limited, and any other publicly-known method can be used.

The system control unit 50 is, for example, at least one processor (CPU) capable of executing programs. By loading a program stored in the non-volatile memory 31 into a memory 30 and executing the program, the system control unit 50 controls the operations of the function blocks constituting the digital camera 100 and realizes the functions of the digital camera 100.

As part of these operations, the system control unit 50 performs automatic exposure control (AE) and automatic focus detection (AF) based on the evaluation values generated by the image processing unit 20. Specifically, based on the evaluation value, the system control unit 50 determines exposure conditions (aperture value, shutter speed, and sensitivity) such that the focus detection area is appropriately exposed. The system control unit 50 then drives the aperture stop 12 through an exposure control unit 40 based on the exposure conditions, and controls the operations of the image sensor 14. Furthermore, the system control unit 50 obtains a defocus amount based on a phase difference between the pair of focus detection pixel signals generated by the image processing unit 20. Then, based on the defocus amount, the system control unit 50 causes the lens unit 10 to focus on the focus detection area by driving the focus lens of the lens unit 10 through the focus control unit 42. Note that the system control unit 50 may perform autofocus based on a contrast evaluation value.

Note that in the present embodiment, the system control unit 50 sets the focus detection area for which the AF evaluation value is generated based on the subject area detected by the image processing unit 20. For example, setting the subject area or a partial area of the focus detection area to the focus detection area makes it possible to implement autofocus in which the lens unit 10 focuses on the subject area. If the image processing unit 20 has detected a plurality of subject areas, the system control unit 50 selects one of the subject areas as a main subject area and sets that area as the focus detection area. The method for selecting the main subject area from the plurality of subject areas is not particularly limited. The main subject area may be designated by a user, or may be selected by the system control unit 50 based on at least one of the positions, sizes, and reliabilities of the individual subject areas.

The non-volatile memory 31 is electrically rewritable, and stores programs executed by the system control unit 50, as well as various types of setting values, GUI data, and the like of the digital camera 100. The trained models and characteristic data used by the image processing unit 20 can also be stored in the non-volatile memory 31. The memory 30 is used when the system control unit 50 executes programs, for temporarily storing image data, and the like. Part of the memory 30 is also used as a video memory for an image display unit 28.

The memory control unit 22 controls access to the memory 30 by the A/D converter 16 and the image processing unit 20. The memory control unit 22 controls the operations of the timing generator 18.

The image display unit 28 is a display apparatus that displays an image based on the display image data written into the video memory area of the memory 30. The image display unit 28 functions as an electronic viewfinder (EVF) by immediately displaying shot moving images in the image display unit 28. The processing for causing the image display unit 28 to function as an EVF is called "live view processing", and the display image data used in the live view processing is called "live view image data". The present embodiment assumes that the image display unit 28 is a touch screen.

The compression/decompression unit 32 encodes the recording image data generated by the image processing unit 20, decodes encoded image data read out from a recording unit 202, and the like. Although the encoding method is not particularly limited, still images are typically encoded using an encoding method based on the JPEG standard, and moving images are typically encoded using an encoding method based on the MPEG standard.

The exposure control unit 40 drives the aperture stop 12 under the control of the system control unit 50.

A flash 48 is an auxiliary light source. The system control unit 50 determines whether to turn on the flash 48 based on the settings of the digital camera 100 and the evaluation values generated by the image processing unit 20. The operations of the flash 48 are controlled by the system control unit 50.

A mode dial 60 sets the digital camera 100 to one of function modes including power off, an automatic shooting mode, a shooting mode, a panoramic shooting mode, a moving image shooting mode, a playback mode, a PC connection mode, and the like.

A shutter switch 62 is a switch for shooting still images, and includes SW1, which turns on when the switch is pressed halfway, and SW2, which turns on when the switch is pressed fully. The system control unit 50 recognizes SW1 being on as a shooting preparation instruction, and SW2 being on as a shooting instruction. The system control unit 50 executes shooting preparation operations, such as AF and AE operations, in response to the shooting preparation instruction. Additionally, the system control unit 50 executes a series of operations, from shooting a still image to recording, in response to the shooting instruction. The recording image data generated by the image processing unit 20 is encoded by the compression/decompression unit 32 as necessary, and is then recorded into a recording medium 200 through an interface (I/F) 90 in the form of an image data file.

A display change switch 66 switches the image display unit 28 on and off. The power consumption can be reduced by turning the image display unit 28 off when not in use, e.g., when using an optical viewfinder 104.

When a zoom switch 72 is operated, the system control unit 50 drives the zoom lens through the zoom control unit 44 and changes the angle of view of the lens unit 10. Whether to broaden or narrow the angle of view is determined in accordance with the operation of the zoom switch 72.

"Operation unit 70" is a collective name for input devices provided in the digital camera 100 that have not been described here. The operation unit 70 includes a menu button, a set button, a directional key, a moving image recording button, and the like. If the image display unit 28 is a touch screen, a touch panel provided in the image display unit 28 is included in the operation unit 70.

A power source 86 supplies power to the digital camera 100. The power source 86 may be a battery installed in the digital camera 100, or may be an external power source such as an AC adapter.

The interface 90 is a communication interface with the recording medium 200. The recording medium 200 is connected to a connector 92. The recording medium 200 is a memory card, for example. The recording medium 200 includes a recording unit 202 that stores data, and an interface 204 for communicating with an external device to which a connector 206 of the recording medium 200 is connected (in this case, the digital camera 100).

A communication unit 110 communicates with the external device through a connector or an antenna 112. The communication unit 110 supports at least one wired and/or wireless communication standard and has hardware corresponding to the supported standard.

A gyrosensor 115 outputs a signal based on motion (an angular velocity) of the digital camera 100 to the system control unit 50. The system control unit 50 integrates signals output by the gyrosensor, and detects the motion of the digital camera 100 as a combination of changes in angles about axes. The system control unit 50 can use the detected motion of the digital camera 100 for image stabilization, to detect panning operations, and the like, for example.

Still Image Shooting Processing

Still image shooting processing through which the digital camera 100 shoots and records still images will be described with reference to the flowchart in FIG. 3.

In step S301, the system control unit 50 determines whether the operation mode of the digital camera 100 is set to a still image shooting mode, and executes step S302 if it is determined that the operation mode is set to the still image shooting mode. If it is not determined that the operation mode is set to the still image shooting mode, operations pertaining to still image shooting and recording will not be performed, and the system control unit 50 therefore ends the still image shooting processing.

In step S302, the system control unit 50 determines whether preparations for live view processing are complete, executes step S303 if the preparations are complete, and repeats step S302 if not. The system control unit 50 can determine that the preparations for live view processing are complete in response to the timing generator 18 becoming capable of supplying a clock signal, control signals, and the like for live view display to the image sensor 14, the A/D converter 16, and the like.

In step S303, the system control unit 50 starts the live view processing, and then executes step S304. The live view processing is a series of processing for causing the image display unit 28 to function as an EVF. Specifically, processing in which the image sensor 14 shoots a moving image, the image processing unit 20 generates display image data and stores that data in the memory 30, and that data is displayed in the image display unit 28 is performed continuously. Upon starting the live view processing in step S303, the system control unit 50 executes the processing from step S304 on while continuing to execute the live view processing until the still image shooting mode ends.

The image processing unit 20 also executes subject detection processing on the image data generated through the live view processing, and outputs the result to the system control unit 50. Note that the subject detection processing may be performed for all frames of the shot moving image, or may be carried every predetermined number of frames. The system control unit 50 may dynamically determine the frequency at which to perform the subject detection processing by taking into account the shooting or display framerate of the moving image, the processing capabilities of the image processing unit 20, and the like.

In step S304, the system control unit 50 executes main subject determination processing, determines the main subject area from the subject areas detected by the image processing unit 20, and then executes step S305. The main subject determination processing will be described in detail later.

In step S305, the system control unit 50 determines whether the main subject area has been determined in the main subject determination processing, executes step S306 if it is determined that the main subject area has been determined, and executes step S310 if not.

In step S306, the system control unit 50 instructs the image processing unit 20 to superimpose and display an indicator indicating the main subject area along with information on the main subject area. The image processing unit 20 generates image data for the live view display, in which the image of the indicator indicating the main subject area is superimposed, and stores the image data in the memory 30. The indicator may be at least a part of a rectangular outline bounding the main subject area, for example. It is assumed here that the entire outline, i.e., a frame-shaped indicator, is superimposed and displayed. However, an indicator of any size and in any form that indicates the main subject area can be used.

Figure 7A:
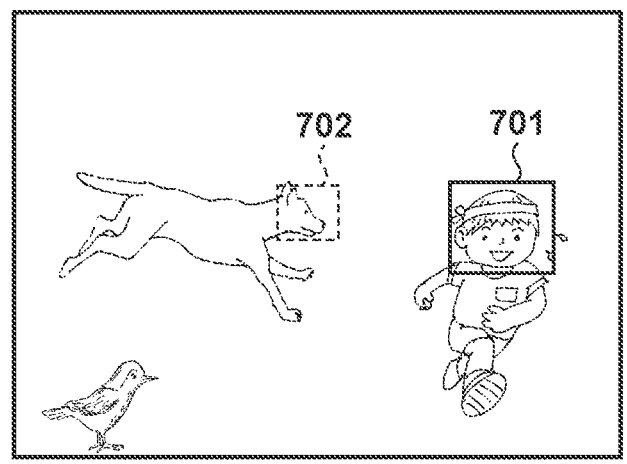
FIGS. 7A to 7C are diagrams illustrating examples of the display of an indicator for a characteristic area according to the embodiment.

FIG. 7A is a diagram illustrating an example of the display of the indicator in the main subject area. Here, the main subject is the person on the right, and a rectangular frame-shaped indicator 701 encompassing the face area is displayed. On the other hand, an indicator 702, which is visually different from the indicator 701, is superimposed on an area of a subject detected in the same image but different from the main subject (i.e., a sub-subject). For the sake of simplicity, the indicator displayed for the sub-subject area will be called a "sub-frame" hereinafter.

Returning to FIG. 3, in step S307, the system control unit 50 executes sub-frame display processing, which is indicator display processing for the sub-subject area, and then executes step S308. Details of the sub-frame display processing will be given later.

In step S308, the system control unit 50 determines whether the sub-frame has been displayed in the sub-frame display processing of step S307, executes step S309 if it is determined that the sub-frame has been displayed, and executes step S310 if not.

In step S309, the system control unit 50 executes main subject switching processing, and then executes step S310. The main subject switching processing is processing for switching the main subject in response to a user instruction. Details of the main subject switching processing will be given later.

In step S310, the system control unit 50 determines whether to end the shooting mode. The system control unit 50 can determine that the shooting mode is to be ended when, for example, the operation mode of the digital camera 100 has been switched from the still image shooting mode to another mode (e.g., the playback mode), when the power is turned off, or the like. If it is determined that the shooting mode is to be ended, the system control unit 50 ends the still image shooting operations, and executes processing according to the circumstances. On the other hand, if it is not determined that the shooting mode is to be ended, the system control unit 50 executes step S311.

In step S311, the system control unit 50 determines whether SW1 of the shutter switch 62 is on, executes step S312 if it is determined that SW1 is on, and executes step S317 if not.

In step S312, the system control unit 50 determines whether the main subject area is determined, in the same manner as in step S305, executes step S313 if it is determined that the main subject area is determined, and executes step S314 if not.

In step S313, the system control unit 50 sets the focus detection area based on the main subject area and executes AF processing. Specifically, the system control unit 50 obtains a focus detection signal for the focus detection area from the image processing unit 20, and obtains a defocus amount. The system control unit 50 then drives the focus lens based on the defocus amount through the focus control unit 42 so that the lens unit 10 focuses on the focus detection area. Meanwhile, the system control unit 50 obtains AE evaluation values for the focus detection area from the image processing unit 20, executes AE processing, and determines the exposure conditions. The system control unit 50 then executes step S315.

In step S314, the system control unit 50 obtains the focus detection signal from the image processing unit 20 for a predetermined plurality of areas, and obtains the defocus amount. The system control unit 50 then drives the focus lens through the focus control unit 42 such that the lens unit 10 focuses on an area where the subject distance is the shortest, based on the defocus amount. The system control unit 50 then executes step S315. Note that the area in the shooting range where the subject distance is the shortest may be determined based on a defocus map that can be generated using the focus detection pixels of the image sensor 14, for example.

In step S315, the system control unit 50 determines whether SW2 of the shutter switch 62 is on, executes step S316 if it is determined that SW2 is on, and executes step S317 if not.

In step S316, the system control unit 50 executes still image shooting and recording processing. The system control unit 50 executes still image shooting by controlling the aperture stop 12 and the image sensor 14 based on the most recently determined exposure conditions in the shooting preparation instruction made when SW1 is on. The image processing unit 20 then generates still image data for recording and stores the data in the memory 30. The system control unit 50 encodes the still image data using the compression/decompression unit 32 as necessary, and then records the image data file in the recording medium 200 through the I/F 90. Note that the live view processing may be suspended during the still image shooting processing. Once the shooting processing ends, the system control unit 50 executes step S317.

In step S317, the system control unit 50 determines whether the main subject area is determined, in the same manner as in step S305, executes step S318 if it is determined that the main subject area is determined, and executes step S304 if not.

In step S318, the system control unit 50 causes the image processing unit 20 to execute tracking processing for the main subject area. The image processing unit 20 searches out an area most similar to the main subject area determined through the most recent main subject determination processing in a frame shot later than the frame on which the most recent main subject determination processing was executed (e.g., the next frame). The image processing unit 20 then notifies the system control unit 50 of the position, size, search reliability, and the like of the searched-out area as a result of the tracking processing. The search range may be limited to the detected subject area in the tracking processing performed on the frame on which the subject detection processing has been performed. Note that if an area for which the search reliability satisfies a predetermined threshold is not found, the image processing unit 20 notifies the system control unit 50 that the search processing has failed.

Upon starting the tracking processing, the image processing unit 20 continues the tracking processing with the area detected by the most recently executed tracking processing as the main subject area until the next main subject determination processing is executed. Through this, the image processing unit 20 tracks the area of the same subject.

In step S319, the system control unit 50 determines whether the tracking processing has succeeded based on the result of the tracking processing for which the notification was made by the image processing unit 20. The system control unit 50 determines that the tracking processing has succeeded if, for example, the reliability of the search result satisfies a predetermined threshold. The system control unit 50 executes step S306 if it is determined that the tracking processing has succeeded, and executes S304 if not. In this manner, when the tracking processing has failed for the image processing unit 20, the main subject determination processing is executed again, and the main subject area tracked by the image processing unit 20 is updated. Note that instead of executing the main subject determination processing when the tracking processing fails once, the main subject determination processing may be executed when the tracking processing has failed a predetermined number of times in a row.

Main Subject Determination Processing

Figure 4:
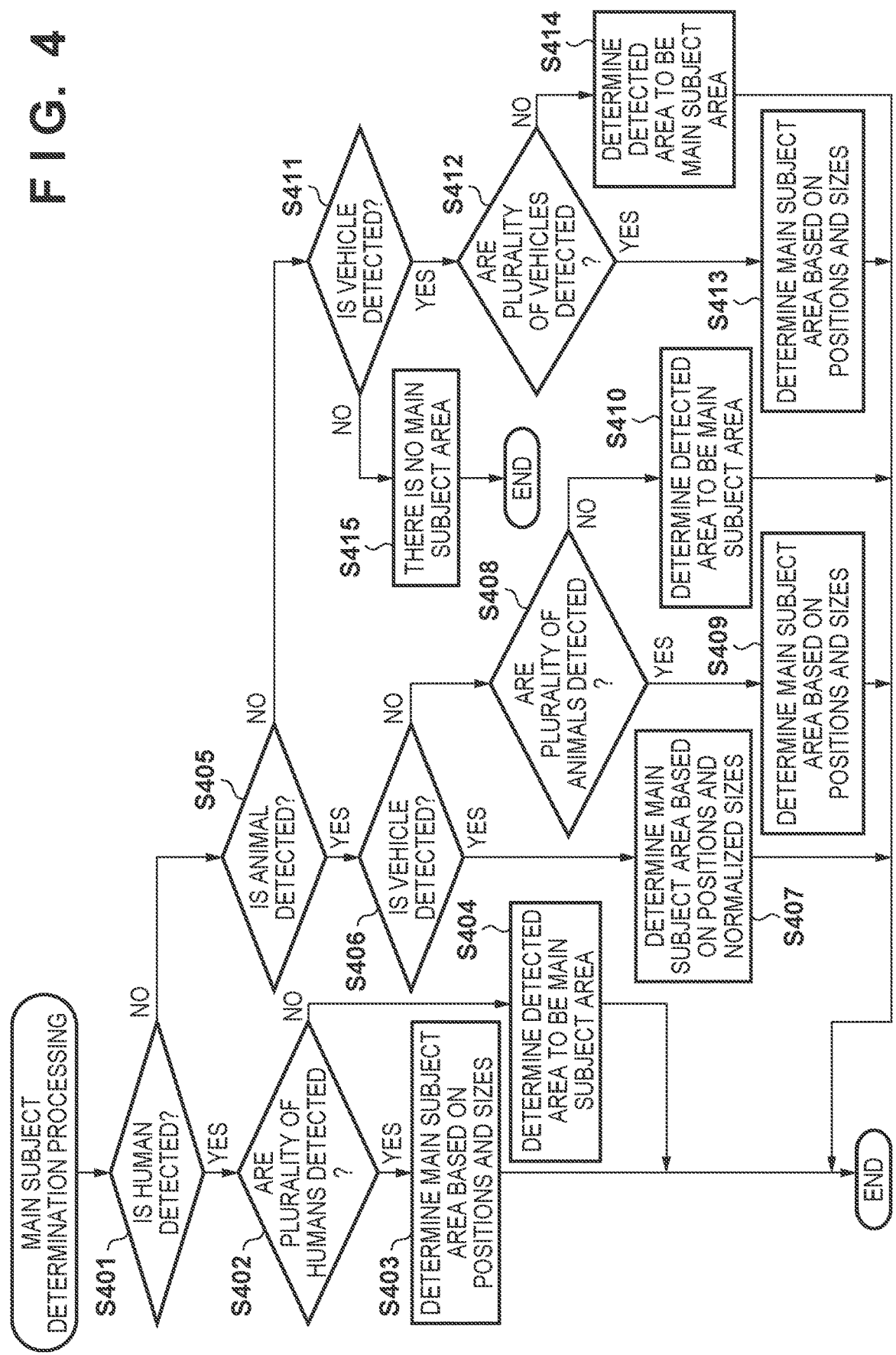
FIG. 4 is a flowchart pertaining to operations by the digital camera according to the embodiment.

The main subject determination processing in step S304 will be described in detail next with reference to the flowchart in FIG. 4.

In step S401, the system control unit 50 determines whether an area of a human subject has been detected based on the result of the subject detection processing performed by the image processing unit 20. Here, it is assumed, as one example, that the targets of the subject detection processing are human subjects, animal subjects, and vehicle subjects. The system control unit 50 executes step S402 if it is determined that an area of the human subject has been detected, and executes step S405 if not.

In step S402, the system control unit 50 determines whether a plurality of human subject areas have been detected, executes step S403 if a plurality of areas have been detected, and executes step S404 if not.

In step S403, the system control unit 50 determines the main subject area from the plurality of areas detected. It is assumed here, as an example, that the main subject is determined based on the position and size of the face area. The system control unit 50 can, for example, convert the position and the size into respective weights (coefficients), and determine the main subject by multiplying the values obtained as a result. For example, the position weight can be set in advance such that the weight increases as the distance between the focus detection area and the subject area (e.g., a center-to-center distance) decreases, and the size weight such that the weight increases as the size of the subject area increases. In this case, the system control unit 50 determines the subject area having the highest product of the position and size weights as the main subject area, and then ends the main subject determination processing.

Note that the main subject area may be determined using another method. For example, a weight that increases the closer a face is to facing forward may be used, or a weight that increases the higher the reliability of the detection is may be used.

Step S404 is executed when there is only one human subject area detected. Accordingly, the system control unit 50 determines the human subject area detected as the main subject area and ends the main subject determination processing.

In step S405, the system control unit 50 determines whether an animal subject area has been detected, executes step S406 if it is determined that such an area has been detected, and executes step S411 if not.

In step S406, the system control unit 50 determines whether a vehicle subject area has been detected, executes step S407 if it is determined that such an area has been detected, and executes step S408 if not.

In step S407, the system control unit 50 determines the main subject based on the positions and sizes of the individual subject areas, and ends the main subject determination processing. As in the case of a human subject, the main subject can be determined having converted the position and the size into respective weights. However, since both the animal subject and the vehicle subject have been detected, the sizes are normalized before being converted to weights. Specifically, the sizes are normalized such that the sizes of the animal subject and vehicle subject areas are the same, at equal distances in the optical axis direction from the digital camera 100. For example, the sizes can be normalized by applying coefficients calculated statistically using a plurality of samples in advance to at least one of the animal subject area and the vehicle subject area. Note that the position and size weights may be different from those used for the human subject area.

In step S408, the system control unit 50 determines whether a plurality of animal subject areas have been detected, executes step S409 if it is determined that a plurality of such areas have been detected, and executes step S410 if not.

In step S409, the system control unit 50 determines the main subject based on the positions and sizes of the individual subject areas, and ends the main subject determination processing. As in the case of a human subject, the main subject can be determined having converted the position and the size into respective weights.

Step S410 is executed when there is only one animal subject area detected. Accordingly, the system control unit 50 determines the animal subject area detected as the main subject area and ends the main subject determination processing.

In step S411, the system control unit 50 determines whether a vehicle subject area has been detected, executes step S412 if it is determined that such an area has been detected, and executes step S415 if not.

In step S412, the system control unit 50 determines whether a plurality of vehicle subject areas have been detected, executes step S413 if it is determined that a plurality of such areas have been detected, and executes step S414 if not.

In step S413, the system control unit 50 determines the main subject based on the positions and sizes of the individual subject areas, and ends the main subject determination processing. As in the case of a human subject, the main subject can be determined having converted the position and the size into respective weights.

Step S414 is executed when there is only one vehicle subject area detected. Accordingly, the system control unit 50 determines the vehicle subject area detected as the main subject area and ends the main subject determination processing.

In step S415, the system control unit 50 determines that there is no main subject area, and then ends the main subject determination processing.

Sub-Frame Display Determination

Figure 5A:
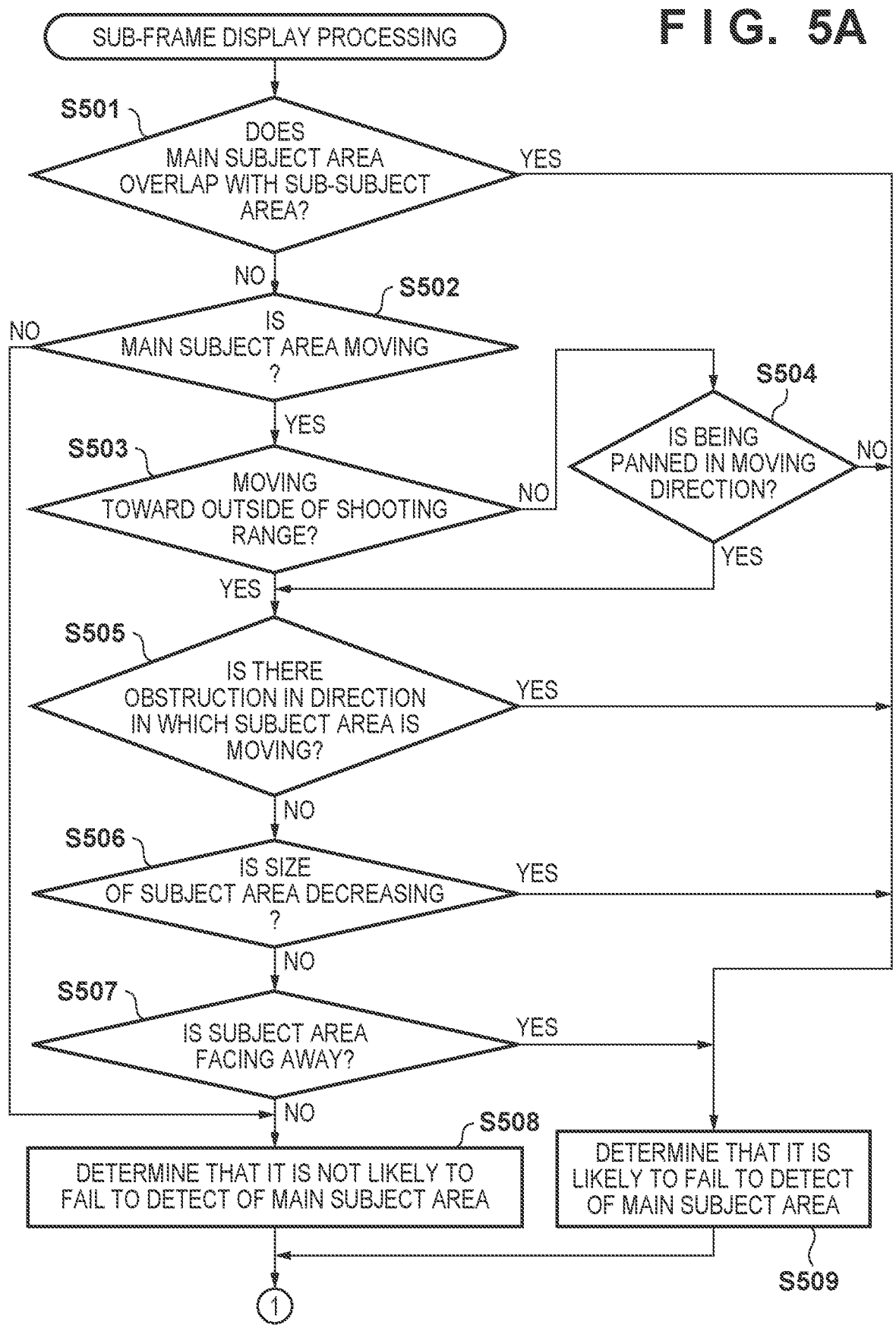
FIGS. 5A and 5B are flowcharts pertaining to operations by the digital camera according to the embodiment.
Figure 5B:
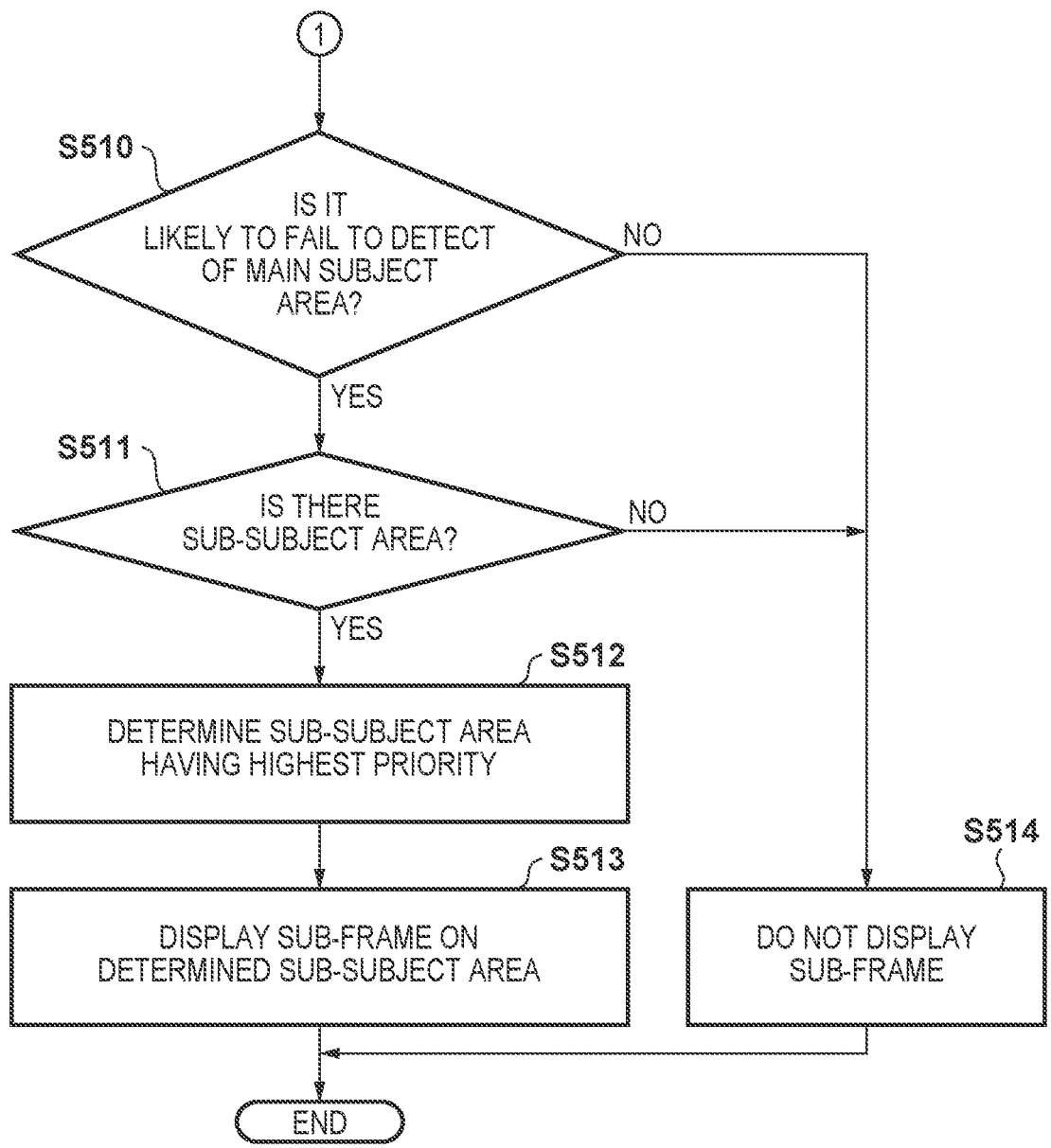

The sub-frame display processing in step S307 will be described in detail next with reference to the flowcharts in FIGS. 5A and 5B. In the sub-frame display processing, whether to display an indicator in a sub-main subject area (the sub-frame) is determined, and when it is determined that the indicator is to be displayed, the indicator is displayed in the sub-subject area to be displayed.

In step S501, the system control unit 50 determines whether the main subject area overlaps with the sub-subject area. The system control unit 50 can determine that the main subject area overlaps with the sub-subject area when, for example, the percentage of the part of the main subject area that overlaps with at least one other sub-subject area exceeds a threshold. Alternatively, the system control unit 50 can determine that the main subject area overlaps with the sub-subject area when the sub-subject area overlaps within a range which is a certain distance from the center of a specific partial area of the main subject area (e.g., the face area in a human subject area). These are merely examples, and the determination may be based on other conditions. The system control unit 50 executes step S509 if it is determined that the main subject area overlaps with the sub-subject area, and executes step S502 if not.

In step S509, the system control unit 50 determines that it is easy to lose sight of the main subject area, and executes step S510 after setting a flag, for example. A state in which it is "easy to lose sight" of the main subject area can also be said to be a state in which the tracking processing on the current main subject area is likely to become impossible in the near future.

In step S502, the system control unit 50 determines whether the main subject area is moving, executes step S503 if it is determined that the main subject area is moving, and executes step S508 if not. The system control unit 50 can determine whether the main subject area is moving based on a change over time in the position of the main subject area obtained as a result of the tracking processing, for example, but the determination may be made through another method as well.

In step S503, the system control unit 50 determines whether the main subject area is toward the outside of the shooting range. The system control unit 50 can determine that the main subject area is moving toward the outside of the shooting range when, for example, the shortest distance among the distances between the center of the main subject area and the four sides of the image is decreasing over time. Alternatively, the system control unit 50 may estimate the length of time until a part of the main subject area exits the shooting range based on the amount of movement in the main subject area, and if the estimated length of time is within a predetermined length of time, the main subject area may be determined to be moving toward the outside of the shooting range. Of course, the determination may be made through another method. The system control unit 50 executes step S505 if it is determined that the main subject area is moving toward the outside of the shooting range, and executes step S504 if not.

In step S504, the system control unit 50 determines whether the digital camera 100 is being panned in the direction in which the main subject area is moving, executes step S505 if it is determined that the digital camera 100 is being panned, and executes step S509 if not. If an angular difference between the direction in which the digital camera 100 is moving, based on the signal output by the gyrosensor 115, and the direction in which the main subject area is moving is less than a threshold, the system control unit 50 determines that the digital camera 100 is being panned in the direction in which the main subject area is moving. Note that the movement of the digital camera 100 may be determined using another method, such as based on a motion vector between frames.

If the panning direction is different from the direction in which the main subject area is moving, or if panning is not being performed, it is assumed that the main subject will move outside the shooting range in the near future and the likelihood that the tracking processing for the current main subject area will fail is relatively high. Accordingly, in step S509, the system control unit 50 determines that it is easy to lose sight of the main subject area, and executes step S510 after setting a flag, for example.

In step S505, the system control unit 50 determines whether there is an object that can hide the main subject (an obstruction) located in the direction in which the main subject is moving. The system control unit 50 estimates a change over time in the position of the main subject in the screen and the distance from the digital camera 100 based on the direction and speed in which the main subject area is moving, for example. The system control unit 50 then determines whether an object is present in front of the path along which the main subject is moving based on a defocus map that can be generated using the focus detection pixels of the image sensor 14, for example. If such an object is present, the system control unit 50 can determine that an obstruction is located in the direction in which the main subject is moving. The system control unit 50 executes step S509 if it is determined that there is an obstruction located in the direction in which the main subject is moving, and executes step S506 if not.

If it is determined that there is an obstruction located in the direction in which the subject is moving, it is assumed that the likelihood that the tracking processing for the current main subject area will fail in the near future is relatively high. Accordingly, in step S509, the system control unit 50 determines that it is easy to lose sight of the main subject area, and executes step S510 after setting a flag, for example.

In step S506, the system control unit 50 determines whether the size of the main subject area is decreasing over time, executes step S509 if it is determined that the size is decreasing, and executes step S507 if not. This determination may be a determination as to whether the distance between the main subject and the digital camera 100 is increasing over time.

If the size of the main subject area is decreasing over time, or if the main subject is moving away from the digital camera 100, it is assumed that the likelihood that the tracking processing for the current main subject area will fail in the near future is relatively high. Accordingly, in step S509, the system control unit 50 determines that it is easy to lose sight of the main subject area, and executes step S510 after setting a flag, for example.

In step S507, the system control unit 50 determines whether the main subject is facing away, executes step S509 if it is determined that the main subject is facing away, and executes step S508 if not. It is assumed here that the main subject is a subject of a type for which the accuracy or the reliability of the tracking processing will drop significantly if the subject is facing away, such as a person, an animal, or the like. For subjects for which the accuracy or the reliability of the tracking processing does not change significantly depending on the orientation, such as vehicle subjects, step S507 may be skipped, or the subject may be considered as not facing away. Whether the main subject is facing away can be determined using a trained deep learning model capable of determining the direction of subjects, such as the orientation of the face of a person or an animal, for example. The image processing unit 20 determines the orientation of the subject based on the trained model, and notifies the system control unit 50 of the determination result. Note that whether the orientation is one in which the tracking accuracy or reliability will drop may be determined instead of determining whether the subject is facing away.

If it is determined that the main subject is facing away, it is assumed that the likelihood that the tracking processing for the current main subject area will fail in the near future is relatively high. Accordingly, in step S509, the system control unit 50 determines that it is likely to fail to detect of the main subject area, and executes step S510 after setting a flag, for example.

In step S508, the system control unit 50 determines that it is not likely to fail to detect of the main subject area, and executes step S510 after removing the flag that is set, for example.

In step S510, the system control unit 50 determines whether the main subject area is easy to lose sight of based on, for example, the state of the flag, executes step S511 if it is determined that the main subject area is easy to lose sight of, and executes step S514 if not. Here, the system control unit 50 determines that it is not easy to lose sight of the main subject area if the flag is set (e.g., to 1).

In step S511, the system control unit 50 determines whether a sub-subject area is detected by the image processing unit 20, executes step S512 if it is determined that a sub-subject area is detected, and executes step S514 if not.

In step S512, the system control unit 50 determines the sub-subject area having the highest priority. For example, the system control unit 50 can determine the sub-subject area having the highest priority by executing the main subject determination processing described with reference to FIG. 4 on the sub-subject area.

In step S513, the system control unit 50 instructs the image processing unit 20 to display the sub-frame along with the information of the sub-subject area determined in step S512. The image processing unit 20 generates image data for live view display in which a sub-frame is superimposed on the sub-subject area for which information has been obtained from the system control unit 50, and then ends the sub-frame display processing. FIG. 7A illustrates an example of the display of the sub-frame 702. The indicator 701 and the sub-frame 702 displayed in the main subject area differ in terms of color, pattern (e.g., a solid line or a dotted line), and the like so as to be visually distinguishable from each other.

On the other hand, in step S514, the system control unit 50 determines not to display the sub-frame and ends the sub-frame display processing.

In this manner, in the present embodiment, even when a sub-subject area is detected, the indicator is displayed only in the main subject area when the main subject area is being tracked in a stable manner. Accordingly, the user can focus on shooting the main subject.

Additionally, when it is determined that the tracking of the main subject area may fail in the near future, the display of an indicator is added for a single sub-subject area which is likely to become a new main subject area that replaces the current main subject area. Accordingly, when the indicator of the sub-subject area is displayed during shooting, the user can ascertain in advance that the tracking of the current main subject area may end soon. Furthermore, the user can ascertain in advance which of the sub-subject areas is likely to become the main subject area next. For example, if the sub-subject area which is likely to become the main subject area next is not the area intended by the user, they can consider whether to select a different sub-subject area as the new main subject area.

Subject Switching Processing

Figure 6:
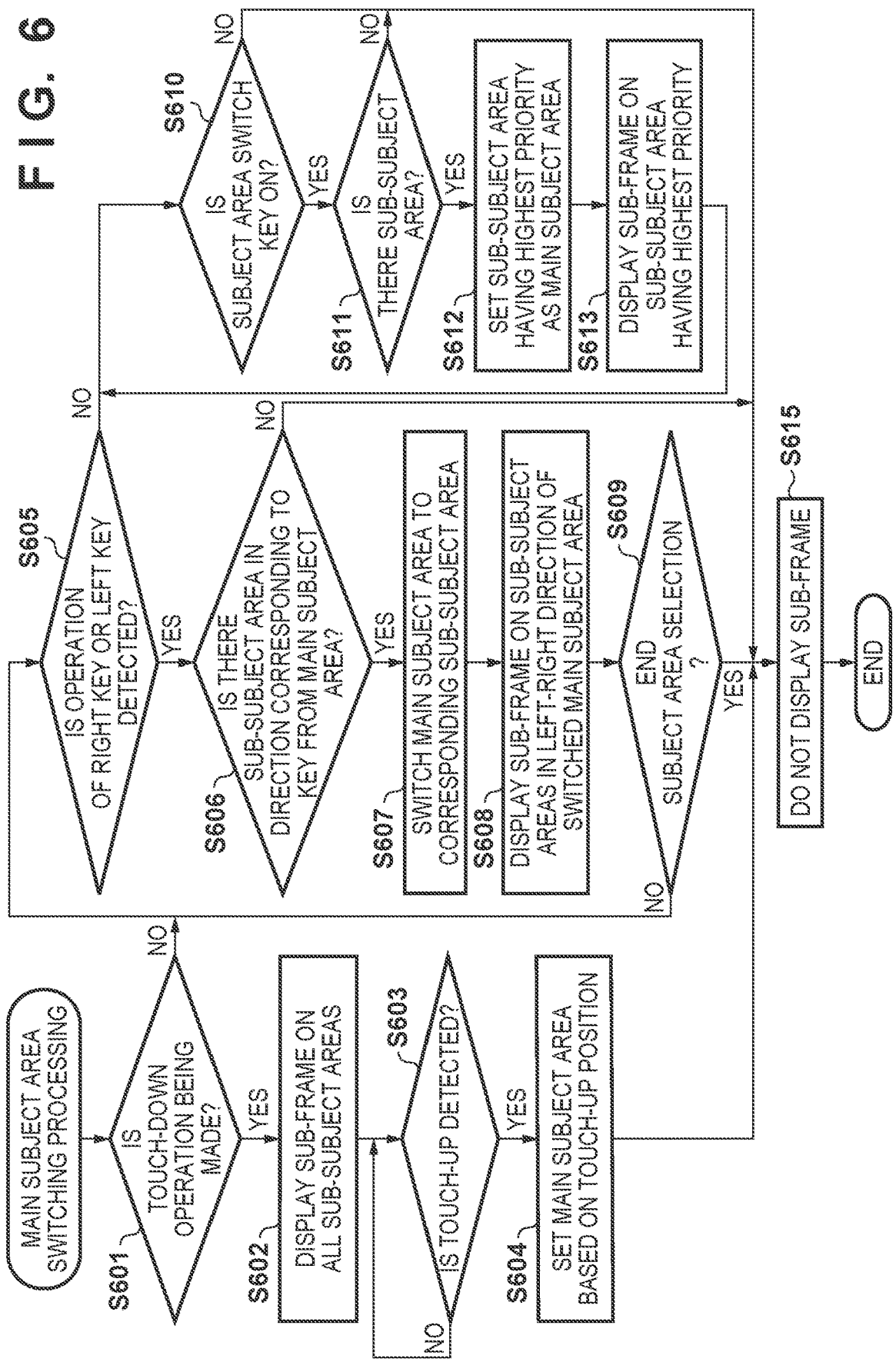
FIG. 6 is a flowchart pertaining to operations by the digital camera according to the embodiment.

The main subject switching processing in step S309 will be described in detail next with reference to the flowchart in FIG. 6. The main subject switching processing is processing for changing the main subject area in response to a user instruction.

In step S601, the system control unit 50 determines whether a touch-down operation is being made on the touch panel of the image display unit 28. A "touch-down operation" is a state in which the touch panel is sensing contact. The system control unit 50 executes step S602 if it is determined that a touch-down operation is being performed, and executes step S605 if not. Note that the system control unit 50 may determine that a touch-down operation is being performed when the touch-down operation has continued for a set amount of time.

Figure 7B:
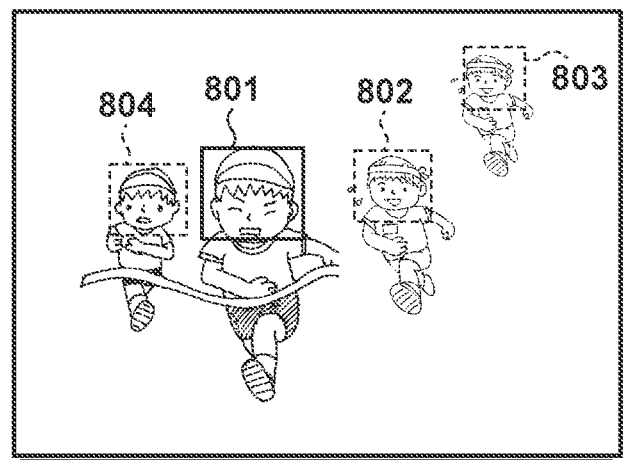

In step S602, the system control unit 50 instructs the image processing unit 20 to generate live view display image data, in which a sub-frame is displayed on all sub-subject areas that can be selected. FIG. 7B illustrates an example of the display of sub-frames 802 to 804 on all the sub-subject areas. Note that an indicator 801 is displayed on the main subject area, and thus in step S602, an indicator is displayed for all the subject areas detected by the image processing unit 20. Note that for areas, among the detected sub-subject areas, having a reliability which is less than or equal to a threshold, the indicators need not be displayed, in order to avoid selecting such areas.

In step S603, the system control unit 50 determines whether a touch-up has been detected. A "touch-up" is a state in which contact which had been sensed by the touch panel (a touch-down) is no longer sensed. The system control unit 50 executes step S604 if it is determined that a touch-up has been detected, and repeatedly executes step S603 if not.

In step S604, the system control unit 50 detects the position at which the touch-up was detected (the position at which contact was last detected before the touch-up was detected). The system control unit 50 then sets the subject area including the detected position as the main subject area designated by the user, and then executes step S615.

For example, in FIG. 7B, if a touch-up has been detected within the indicators 801 to 804, the system control unit 50 sets the subject area corresponding to the indicator including the position at which the touch-up was detected as the main subject area. If a touch-up has been detected in the torso, limb area, or the like of a human or animal subject, the system control unit 50 may set the face area corresponding thereto as the main subject area.

Note that if no touch-up is detected within an indicator, the system control unit 50 may set a subject area for which the distance in the image from the position where the touch-up was detected is less than or equal to a threshold as the main subject area designated by the user. Alternatively, the system control unit 50 may set, as the main subject area, a subject area determined based on the subject distance from the position where the touch-up was detected, the color of the pixel at the position where the touch-up was detected, or the like.

In this manner, when a touch-down operation is detected, an indicator is displayed on all of the selectable subject areas. Accordingly, the user can ascertain the detected subject area and the subject areas that can be selected as the main subject area. Additionally, when a new main subject area is selected, the display of the indicator on areas aside from the main subject area ends, and thus the display of the indicator does not interfere with subsequent shooting.

In step S605, the system control unit 50 determines whether an operation on one of a plurality of operation members, included in the operation unit 70, which correspond to respective ones of a plurality of directions, has been detected, executes step S606 if such an operation has been detected, and executes step S610 if not. It is assumed here that the plurality of directions are the left direction and the right direction, and that the plurality of operation members are a left directional key or a right directional key.

In step S606, the system control unit 50 determines whether a sub-subject area is present in a direction corresponding to the directional key detected as being operated in step S605, using the current main subject area as a reference. The system control unit 50 executes step S607 if it is determined that a sub-subject area is present in the direction corresponding to the operated directional key, and executes step S615 if not.

In step S607, the system control unit 50 sets the sub-subject area present in the direction corresponding to the operated directional key as the new main subject area, and then executes step S608. Note that when a plurality of sub-subject areas are present in the direction corresponding to the operated directional key, the system control unit 50 sets the sub-subject area closest to the current main subject area as the new main subject area.

In step S608, the system control unit 50 displays the indicator on the newly-set main subject area, and instructs the image processing unit 20 to display the sub-frame on the sub-subject areas closest to the newly-set main subject area in the left-right direction. The image processing unit 20 changes the indicators superimposed on the image data for live view display in response to the instruction.

Figure 7C:
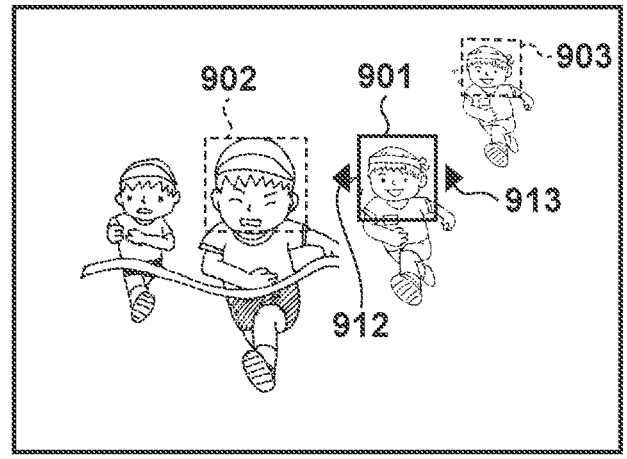

FIG. 7C is a diagram illustrating an example of the live view display in step S608. An indicator 901 is displayed on the new main subject area, and sub-frames 902 and 903 are displayed on the sub-subject areas closest thereto in the left-right direction. Indicators 912 and 931, indicating that the main subject area can be switched by operating the left directional key and the right directional key, are also displayed to the left and right of the indicator 901.

In step S609, the system control unit 50 determines whether the operation for switching the main subject area has ended, executes step S615 if it is determined that the operation has ended, and executes step S605 if not. The system control unit 50 can determine that the operation for switching the main subject area has ended when, for example, the right directional key and the left directional key have not been operated for a continuous set length of time. Alternatively, the system control unit 50 can determine that the operation for switching the main subject area has ended when, for example, the operation of a specific input device aside from the right directional key and the left directional key has been detected.

When the main subject area is changed in response to a directional key being operated, a sub-frame is displayed in each direction for the subject area that will be set as the main subject area the next time that directional key is operated. Accordingly, the user can ascertain which subject area will be set as the main subject area for each directional key the next time that directional key is operated. Additionally, when it is determined that a new main subject area has been selected, the display of the indicator on areas aside from the main subject area ends, and thus the display of the indicator does not interfere with subsequent shooting.

In step S610, the system control unit 50 determines whether a subject switch button included in the operation unit 70 has been operated, executes step S611 if it is determined that the button has been operated, and executes step S615 if not. The subject switch button is an operation member that switches the characteristic area to be tracked each time it is operated.

In step S611, the system control unit 50 determines whether a sub-subject area is detected by the image processing unit 20, executes step S612 if it is determined that a sub-subject area is detected, and executes step S615 if not.

In step S612, the system control unit 50 sets the sub-subject area having the highest priority as the main subject area.

In step S613, the system control unit 50 instructs the image processing unit 20 to display the indicator on the sub-subject area having the highest priority among the new main subject area and the sub-subject area after the main subject area has been changed, and then executes step S610. The image processing unit 20 generates image data for live view display in which the indicator is superimposed on the new main subject area and the sub-subject area having the highest priority.

Each time the subject switch button is operated, the sub-subject area having the highest priority at that point in time is set as the new main subject area. Additionally, when the main subject area is changed, a sub-frame is displayed in the sub-subject area, having the highest priority at that point in time, which will be selected the next time the subject switch button is operated. Accordingly, the user can ascertain which subject area will be set as the main subject area the next time the subject switch button is operated. Additionally, when it is determined that a new main subject area has been selected, the display of the indicator on areas aside from the main subject area ends, and thus the display of the indicator does not interfere with subsequent shooting.

In this manner, when an operation for changing the main subject area is detected, the method for displaying the indicator for the subject area can be changed according to the type of the operation, which makes it possible to appropriately support the user in selecting a new main subject area. Additionally, when it is determined that the main subject area has been changed, the display of the indicator on areas aside from the main subject area ends, and thus the display of the indicator does not interfere with subsequent shooting.

As described above, according to the present embodiment, in an image processing apparatus having a subject tracking function, when the tracking processing is stable, an indicator is displayed only for the main subject area which is to be tracked. Accordingly, even if a large number of subject areas are detected, there is no risk that displaying the indicator will impair the visibility of the subject. On the other hand, when conditions under which the likelihood that the tracking processing for the current main subject area will fail in the near future is relatively high are satisfied, an indicator display is added to the sub-subject area that is likely to become the main subject area next. The user can ascertain both that the situation is one in which the likelihood that the tracking processing for the current main subject area will fail in the near future is high, and that the subject area which is likely to become the next main subject area, by the indicator being displayed on the sub-subject area.

Furthermore, when the main subject area is to be switched in response to a user instruction, the method for displaying the indicator on the sub-subject area is varied depending on the type of operation performed to make the switch. Specifically, when an operation in which a single subject area can be selected from all subject areas in response to a single operation (e.g., a touch operation), a sub-frame is displayed on all subject areas. This makes it possible for the user to easily ascertain which subject areas can be selected. When an operation for selecting one of the sub-subject areas adjacent to the current main subject area is made in response to the operation, an indicator is displayed only for sub-subject areas which can be selected through the operation. Furthermore, in the case of an operation for causing the image processing apparatus to automatically select a new main subject area, an indicator is displayed only for the one sub-subject area which will be selected next through the operation. Accordingly, the user can appropriately ascertain sub-subject areas that can be selected through the operation. Furthermore, when it is determined that a new main subject area has been selected, ending the display of the indicators on the sub-subject areas makes it possible to avoid impairing the visibility of the subject as a result of indicators being displayed on the sub-subject areas.

Other Embodiments

Figure 3:
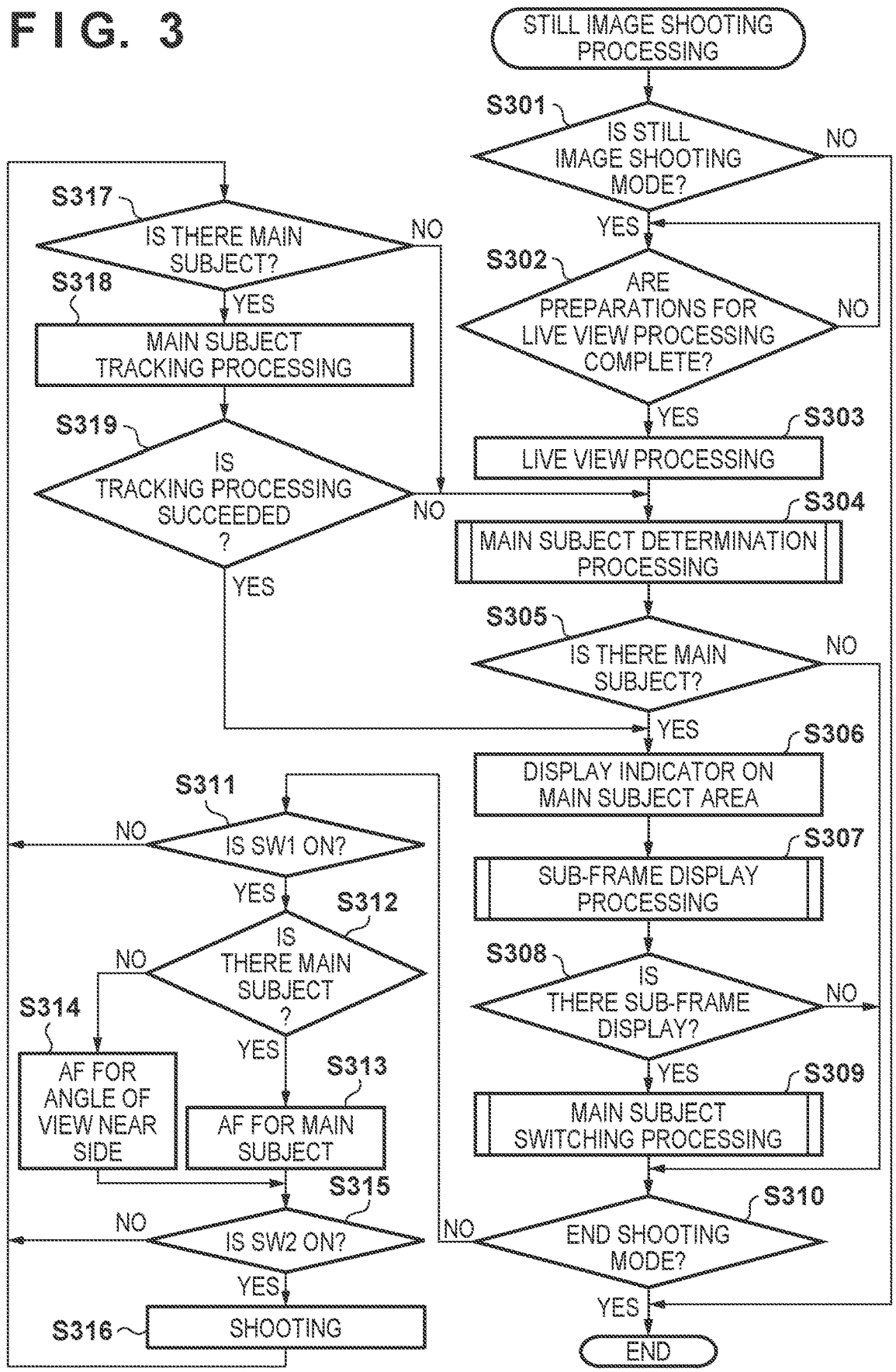
FIG. 3 is a flowchart pertaining to operations by the digital camera according to the embodiment.

For example, although the main subject processing is executed in step S309 of FIG. 3 when the sub-frame is displayed in step S308, the main subject processing of step S309 may be executed regardless of the determination in step S308.

Although displaying indicators in the live view display is described here, indicators may be displayed in the same manner for recorded moving image data, moving image data input from the exterior in real time, and the like.

In the above-described embodiment, when a plurality of types of subject areas are detected, the sub-subject area having the highest priority can be determined from subject areas having the same type as the current main subject area. Alternatively, the sub-subject area having the highest priority may be determined from all subject areas aside from the current main subject area, without considering the type of the subject. The configuration may also be such that the user can select whether to consider the type of the current main subject area when determining the sub-subject area having the highest priority.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-77691, filed May 10, 2022, which is hereby incorporated by reference herein in its entirety.

What is claimed is:

1. An image processing apparatus comprising:
one or more processors that execute a program stored in a memory and thereby function as a plurality of units comprising:
(1) a detecting unit configured to detect characteristic areas from the plurality of images;
(2) a selecting unit configured to select a characteristic area to be tracked from the characteristic areas detected from a same image by the detecting unit;
(3) a tracking unit configured to detect, for a plurality of images obtained chronologically, a position of the characteristic area to be tracked; and
(4) a generating unit configured to generate, based on data of the plurality of images, display image data on which an indicator indicating the characteristic area to be tracked is superimposed,
wherein the generating unit: (1) when any of: overlap between the characteristic area to be tracked and another characteristic area; a change in the position or a size of the characteristic area to be tracked; an orientation of the characteristic area to be tracked; or movement of an apparatus that shot the plurality of images satisfies a predetermined condition, generates the display image data on which an indicator indicating a characteristic area aside from the characteristic area to be tracked is further superimposed; and (2) when the predetermined condition is not satisfied, generates the display image data on which an indicator indicating the characteristic area aside from the characteristic area to be tracked is not superimposed,
wherein the selecting unit selects the characteristic area to be tracked from the characteristic areas detected from the same image by the detecting unit in response to an operation performed on an operating unit provided in the image processing apparatus,
wherein when an operation on a touch screen serving as the operating unit is detected, the generating unit generates display image data in which an indicator is superimposed on each selectable characteristic area, among the characteristic areas from the same image detected by the detecting unit, and
wherein when the operation on the touch screen serving as the operating unit is no longer detected, (1) the selecting unit selects the characteristic area to be tracked in accordance with a position where the operation was last detected, and (2) the generating unit generates display image data in which any indicator indicating a characteristic area is not superimposed on the characteristic areas detected from the same image by the detecting unit, except for the characteristic area selected by the selecting unit.

2. The image processing apparatus according to claim 1, wherein the predetermined condition is set as a condition that the characteristic area to be tracked is likely to become undetectable.

3. The image processing apparatus according to claim 1, wherein the characteristic area on which the indicator is superimposed when the predetermined condition is satisfied is a characteristic area which is most likely to become a new characteristic area to be tracked when the current characteristic area to be tracked becomes undetectable.

4. The image processing apparatus according to claim 1, wherein the characteristic area on which the indicator is superimposed when the predetermined condition is satisfied is a characteristic area, among characteristic areas of a same type as the characteristic area to be tracked, which is most likely to become a new characteristic area to be tracked when the current characteristic area to be tracked becomes undetectable.

5. The image processing apparatus according to claim 1, wherein when an operation is detected on an operation member that switches the characteristic area to be tracked at each operation, the selecting unit selects, as the characteristic area to be tracked, a characteristic area that is different from the current characteristic area to be tracked and has a highest priority from among the characteristic areas detected by the detecting unit.

6. The image processing apparatus according to claim 5, wherein the generating unit generates display image data in which an indicator indicating a characteristic area is superimposed on a characteristic area to be selected when the operation member is operated next.

7. The image processing apparatus according to claim 5, wherein when selection of the characteristic area to be tracked in accordance with the operation on the operation member is determined to have ended, the generating unit generates display image data in which any indicator is not superimposed on the characteristic areas detected from the same image by the detecting unit, except for the characteristic area selected by the selecting unit.

8. An image capture apparatus comprising:
a shooting module that shoots a plurality of images chronologically; and
an image processing apparatus using the plurality of images shot by the shooting module,
wherein the image processing apparatus comprises one or more processors that execute a program stored in a memory and thereby function as a plurality of units comprising:
(1) a detecting unit configured to detect characteristic areas from the plurality of images;
(2) a selecting unit configured to select a characteristic area to be tracked from the characteristic areas detected from a same image by the detecting unit;
(3) a tracking unit configured to detect, for a plurality of images obtained chronologically, a position of the characteristic area to be tracked; and
(4) a generating unit configured to generate, based on data of the plurality of images, display image data on which an indicator indicating the characteristic area to be tracked is superimposed,
wherein the generating unit: (1) when any of: overlap between the characteristic area to be tracked and another characteristic area; a change in the position or a size of the characteristic area to be tracked; an orientation of the characteristic area to be tracked; or movement of an apparatus that shot the plurality of images satisfies a predetermined condition, generates the display image data on which an indicator indicating a characteristic area aside from the characteristic area to be tracked is further superimposed; and (2) when the predetermined condition is not satisfied, generates the display image data on which an indicator indicating the characteristic area aside from the characteristic area to be tracked is not superimposed, wherein the selecting unit selects the characteristic area to be tracked from the characteristic areas detected from the same image by the detecting unit in response to an operation performed on an operating unit provided in the image processing apparatus, wherein when an operation on a touch screen serving as the operating unit is detected, the generating unit generates display image data in which an indicator is superimposed on each selectable characteristic area, among the characteristic areas from the same image detected by the detecting unit, and wherein when the operation on the touch screen serving as the operating unit is no longer detected, (1) the selecting unit selects the characteristic area to be tracked in accordance with a position where the operation was last detected, and (2) the generating unit generates display image data in which any indicator indicating a characteristic area is not superimposed on the characteristic areas detected from the same image by the detecting unit, except for the characteristic area selected by the selecting unit.

9. An image processing method executed by an apparatus, the image processing method comprising:

detecting characteristic areas from the plurality of images;

selecting a characteristic area to be tracked from the characteristic areas detected by the detecting from a same image;

detecting, in a plurality of images obtained chronologically, a position of the characteristic area to be tracked; and generating, based on data of the plurality of images, display image data on which an indicator indicating the characteristic area to be tracked is superimposed, wherein the generating includes: (1) when any of: overlap between the characteristic area to be tracked and another characteristic area; a change in the position or a size of the characteristic area to be tracked; an orientation of the characteristic area to be tracked; or movement of an apparatus that shot the plurality of images satisfies a predetermined condition, generating the display image data on which an indicator indicating a characteristic area aside from the characteristic area to be tracked is further superimposed; and (2) when the predetermined condition is not satisfied, generating the display image data on which an indicator indicating the characteristic area aside from the characteristic area to be tracked is not superimposed, wherein the selecting includes selecting the characteristic area to be tracked from the characteristic areas detected from the same image in response to an operation performed on an operating unit provided in the apparatus, wherein when an operation on a touch screen serving as the operating unit is detected, the generating includes generating display image data in which an indicator is superimposed on each selectable characteristic area, among the characteristic areas detected from the same image, and wherein when the operation on the touch screen serving as the operating unit is no longer detected, (1) the selecting includes selecting the characteristic area to be tracked in accordance with a position where the operation was last detected, and (2) the generating includes generating display image data in which any indicator indicating a characteristic area is not superimposed on the characteristic areas detected from the same image, except for the characteristic area selected in the selecting.

10. A non-transitory computer-readable medium having stored therein a program that, when executed by a computer, causes the computer to function as an image processing apparatus comprising:

a detecting unit configured to detect characteristic areas from the plurality of images;

a selecting unit configured to select a characteristic area to be tracked from the characteristic areas detected from a same image by the detecting unit;

a tracking unit configured to detect, for a plurality of images obtained chronologically, a position of the characteristic area to be tracked; and a generating unit configured to generate, based on data of the plurality of images, display image data on which an indicator indicating the characteristic area to be tracked is superimposed, wherein the generating unit: (1) when any of: overlap between the characteristic area to be tracked and another characteristic area; a change in the position or a size of the characteristic area to be tracked; an orientation of the characteristic area to be tracked; or movement of an apparatus that shot the plurality of images satisfies a predetermined condition, generates the display image data on which an indicator indicating a characteristic area aside from the characteristic area to be tracked is further superimposed; and (2) when the predetermined condition is not satisfied, generates the display image data on which an indicator indicating the characteristic area aside from the characteristic area to be tracked is not superimposed, wherein the selecting unit selects the characteristic area to be tracked from the characteristic areas detected from the same image by the detecting unit in response to an operation performed on an operating unit provided in the image processing apparatus, wherein when an operation on a touch screen serving as the operating unit is detected, the generating unit generates display image data in which an indicator is superimposed on each selectable characteristic area, among the characteristic areas from the same image detected by the detecting unit, and wherein when the operation on the touch screen serving as the operating unit is no longer detected, (1) the selecting unit selects the characteristic area to be tracked in accordance with a position where the operation was last detected, and (2) the generating unit generates display image data in which any indicator indicating a characteristic area is not superimposed on the characteristic areas detected from the same image by the detecting unit, except for the characteristic area selected by the selecting unit.

11. An image processing apparatus comprising:

one or more processors that execute a program stored in a memory and thereby function as a plurality of units comprising:

(1) a detecting unit configured to detect characteristic areas from the plurality of images;

(2) a selecting unit configured to select a characteristic area to be tracked from the characteristic areas detected from a same image by the detecting unit;

(3) a tracking unit configured to detect, for a plurality of images obtained chronologically, a position of the characteristic area to be tracked; and (4) a generating unit configured to generate, based on data of the plurality of images, display image data on which an indicator indicating the characteristic area to be tracked is superimposed, wherein the generating unit: (1) when any of: overlap between the characteristic area to be tracked and another characteristic area; a change in the position or a size of the characteristic area to be tracked; an orientation of the characteristic area to be tracked; or movement of an apparatus that shot the plurality of images satisfies a predetermined condition, generates the display image data on which an indicator indicating a characteristic area aside from the characteristic area to be tracked is further superimposed; and (2) when the predetermined condition is not satisfied, generates the display image data on which an indicator indicating the characteristic area aside from the characteristic area to be tracked is not superimposed, wherein the selecting unit selects the characteristic area to be tracked from the characteristic areas detected from the same image by the detecting unit in response to an operation performed on an operating unit provided in the image processing apparatus, and wherein when an operation on one of a plurality of operation members each corresponding to one of a plurality of directions is detected, the selecting unit selects a characteristic area, among the characteristic areas detected from the same image by the detecting unit, that is closest to the characteristic area to be tracked in a direction corresponding to the one of the plurality of operation members, as the characteristic area to be tracked.

12. The image processing apparatus according to claim 11, wherein the generating unit generates display image data in which an indicator is superimposed on each characteristic area closest in each of the plurality of directions to the characteristic area to be tracked that is selected by the selecting unit.

13. The image processing apparatus according to claim 11, wherein when selection of the characteristic area to be tracked in accordance with the operation on the plurality of operation members is determined to have ended, the generating unit generates display image data in which any indicator is not superimposed on the characteristic areas detected from the same image by the detecting unit, except for the characteristic area selected by the selecting unit.

14. An image processing method executed by an apparatus, the image processing method comprising:

detecting characteristic areas from the plurality of images;

selecting a characteristic area to be tracked from the characteristic areas detected by the detecting from a same image;

detecting, in a plurality of images obtained chronologically, a position of the characteristic area to be tracked; and generating, based on data of the plurality of images, display image data on which an indicator indicating the characteristic area to be tracked is superimposed, wherein the generating includes: (1) when any of: overlap between the characteristic area to be tracked and another characteristic area; a change in the position or a size of the characteristic area to be tracked; an orientation of the characteristic area to be tracked; or movement of an apparatus that shot the plurality of images satisfies a predetermined condition, generating the display image data on which an indicator indicating a characteristic area aside from the characteristic area to be tracked is further superimposed; and (2) when the predetermined condition is not satisfied, generating the display image data on which an indicator indicating the characteristic area aside from the characteristic area to be tracked is not superimposed, wherein the selecting includes selecting the characteristic area to be tracked from the characteristic areas detected from the same image in response to an operation performed on an operating unit provided in the apparatus, and wherein when an operation on one of a plurality of operation members each corresponding to one of a plurality of directions is detected, the selecting includes selecting a characteristic area, among the characteristic areas detected from the same image, that is closest to the characteristic area to be tracked in a direction corresponding to the one of the plurality of operation members, as the characteristic area to be tracked.

* * * * *